F. P. STEPHENS AND E. E. JOHNSON, Jr.
BATTERY BOX.
APPLICATION FILED JUNE 18, 1920.
1,359,446.
Patented Nov. 16, 1920.
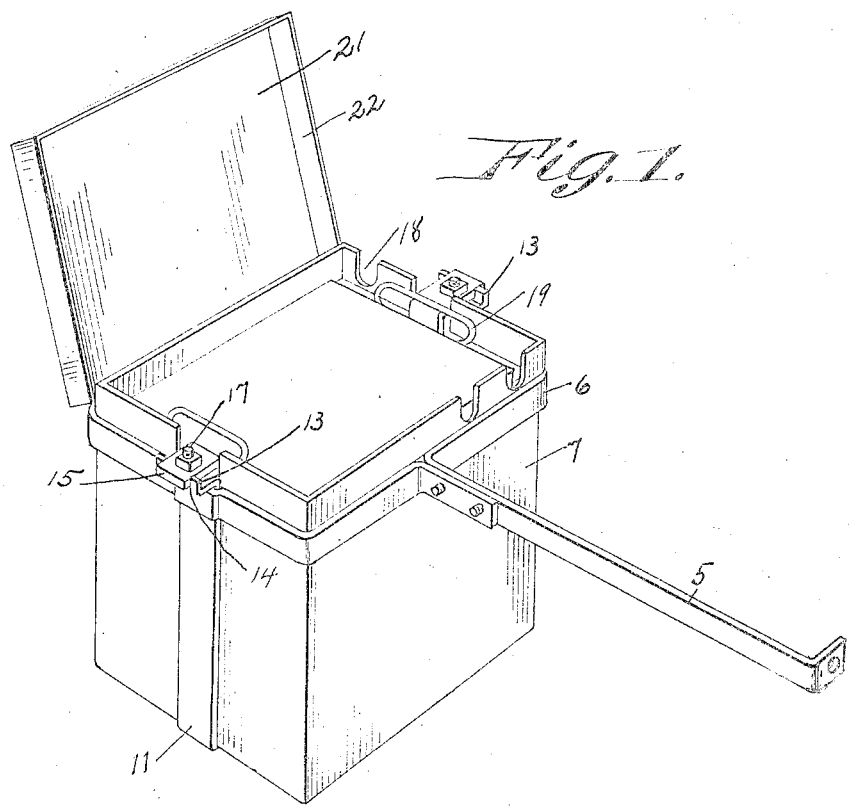
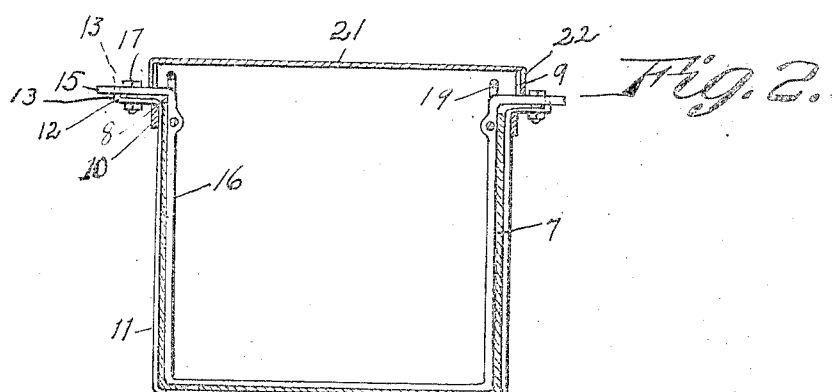

UNITED STATES PATENT OFFICE.

FRANK P. STEPHENS AND EDDIE E. JOHNSON, JR., OF MONTGOMERY, ALABAMA.

BATTERY-BOX.

1,359,446.
Specification of Letters Patent.
Patented Nov. 16, 1920.

Application filed June 18, 1920. Serial No. 389,960.

*To all whom it may concern:*

Be it known that we, FRANK P. STEPHENS and EDDIE E. JOHNSON, Jr., citizens of the United States of America, and residents of Montgomery, in the county of Montgomery and State of Alabama, have invented certain new and useful Improvements in Battery-Boxes, of which the following is a specification.

This invention relates to holders for storage batteries installed in automobiles or other motor driven vehicles, the said device being intended to protect the battery from exposure to the elements and from access of wheel splash whether it be mud, snow or dust, so that fouling of the battery is prevented and deterioration of the elements of the battery is obviated.

A still further object of this invention is to provide a battery box and support having provision for the accommodation of leads or conducting wires so that a battery applied to the box can be connected electrically with the ignition system of the automobile.

A still further object of this invention is to produce a box or container for a battery, the said box being preferably made of metal having an acid proof coating such as paint, the said box having a cover and a drain aperture to permit the escape of battery fluid resulting from a battery leak or overflow due to the expansion of the liquid, which, of course, sometimes heats in charging.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a perspective view of a battery box embodying the invention, and Fig. 2 illustrates a sectional view thereof.

In these drawings 5 denotes an arm of a bracket having a loop or band 6 which receives the battery box 7, the said box having a horizontally disposed shoulder 8 terminating in an upstanding flange 9, the said shoulder 8 being intended to rest on the upper edge of the loop 6. The looped portion 6 is further provided with two offset portions 10 forming recesses in which the supporting hanger or strap 11 may lie, so that the inner surface of the loop and the inner surface of the hanger are practically in alinement. Each end of the hanger extends outwardly as shown at 12, and upwardly as at 13, the said upwardly extending portion at 13 being recessed to form a seat 14 for the outstanding lug 15 of the battery box 16, it being understood that a lug is provided on each side of the battery box to rest in a seat of the upper end of the arm. The lug 15 and the outwardly extending portions 12 of the hanger have a fastening 17 such as a bolt for securing the parts in position against movement or undue vibration.

The flange 9 of the box may have a plurality of notches or recesses such as 18 through which the battery connections of the usual type may be projected for conducting the current from the battery to the electric system of the automobile, and the battery will, of course, be supplied with the usual handles 19.

No attempt has been made to illustrate the details of the battery except as to those parts which coöperate with the box, for it is believed that a conventional showing of the battery is sufficient to illustrate the invention to an understanding by one skilled in the art.

The bottom of the box may have apertures such as 20 to permit drainage of battery fluid, and it is to be understood, as stated initially, that the material of which the box is formed may be protected by an acid proof paint or coating.

A cover 21 may be hingedly connected to the box in any appropriate way, and it has a flange 22 which embraces and fits around the flange 9 of the box with a relatively tight joint to prevent access of detrimental foreign substances.

We claim:

1. In a battery box equipment, a bracket having a loop, a hanger strap supported by the loop and having outwardly extending ends forming bearings, a battery box fitting in the loop and having lugs extending over the ends of the hanger, and means for securing the lugs to the said hanger, as and for the purpose described.

2. In a battery supporting member, a box having a horizontal shoulder near its upper edge and an upstanding flange, the said flange having recesses therein for the reception of conductors of electricity, a cover for the said box having a flange embracing the flange of the box, a bracket having a looped portion, the said looped portion having outwardly extending sections forming seats, a hanger comprising a metallic strap embracing the bottom of the box and having its upper portions lying in the recesses of the loop, the said strap extending outwardly at a point above the loop and terminating in upwardly extending portions with recesses and a battery having lugs extending outwardly therefrom, the said lugs lying in the recesses of the hanger, and means for securing the said lugs to the said hanger.

3. In a battery supporting device for automobiles, a box comprising a metal closure having an acid proof coating, the said box having notches at its upper edge, a cover having a flange fitted around the box at the top, a hanger embracing the box and having outwardly and upwardly extending ends, the said upwardly extending portions of the ends having recesses forming seats, a battery having outstanding lugs lying in the recesses in the ends of the hanger, and means for securing the parts in assembled relation to each other.

FRANK P. STEPHENS.
EDDIE E. JOHNSON, Jr.